United States Patent [19]
Miller et al.

[11] Patent Number: 5,235,398
[45] Date of Patent: Aug. 10, 1993

[54] CAVITY MONITORING SYSTEM

[75] Inventors: Fabien Miller, Ile Perrot; Denis Jacob, Ile Bizard, both of Canada

[73] Assignee: Noranda, Inc., Toronto, Canada

[21] Appl. No.: 840,516

[22] Filed: Feb. 25, 1992

[30] Foreign Application Priority Data

Apr. 25, 1991 [CA] Canada .................. 2041207

[51] Int. Cl.⁵ .............. G01C 3/08; G01C 11/12; G01B 11/22
[52] U.S. Cl. .......................... 356/5; 356/2; 356/378; 356/380; 356/152
[58] Field of Search ........... 356/1, 4, 5, 141, 152, 356/2, 378, 380

[56] References Cited

U.S. PATENT DOCUMENTS

| | | | |
|---|---|---|---|
| 3,705,772 | 12/1972 | Andreas | 356/5 |
| 3,715,953 | 2/1973 | Allan | 356/152 |
| 4,204,772 | 5/1980 | Balasubramian | 356/1 |
| 4,845,990 | 7/1989 | Kitzinger et al. | 73/597 |
| 4,893,933 | 1/1990 | Neiheisel | 356/1 |

*Primary Examiner*—Stephen C. Buczinski
*Attorney, Agent, or Firm*—Keck, Mahin & Cate

[57] ABSTRACT

A cavity monitoring system includes a supporting system adapted to be installed in an access leading to a mined stope, or any other cavity, a mast mounted on the supporting system and adapted to extend into the cavity, and a laser rangefinder mounted at the end of the mast. The laser rangefinder is capable of being rotated around the axis of the mast and directed at the wall of the cavity at angles varying from 0 to 145 degrees from the axis of the mast so as to scan concentric circles on the wall of the cavity permitting a series of distance measurements to be taken to obtain the shape and volume of the cavity.

5 Claims, 4 Drawing Sheets

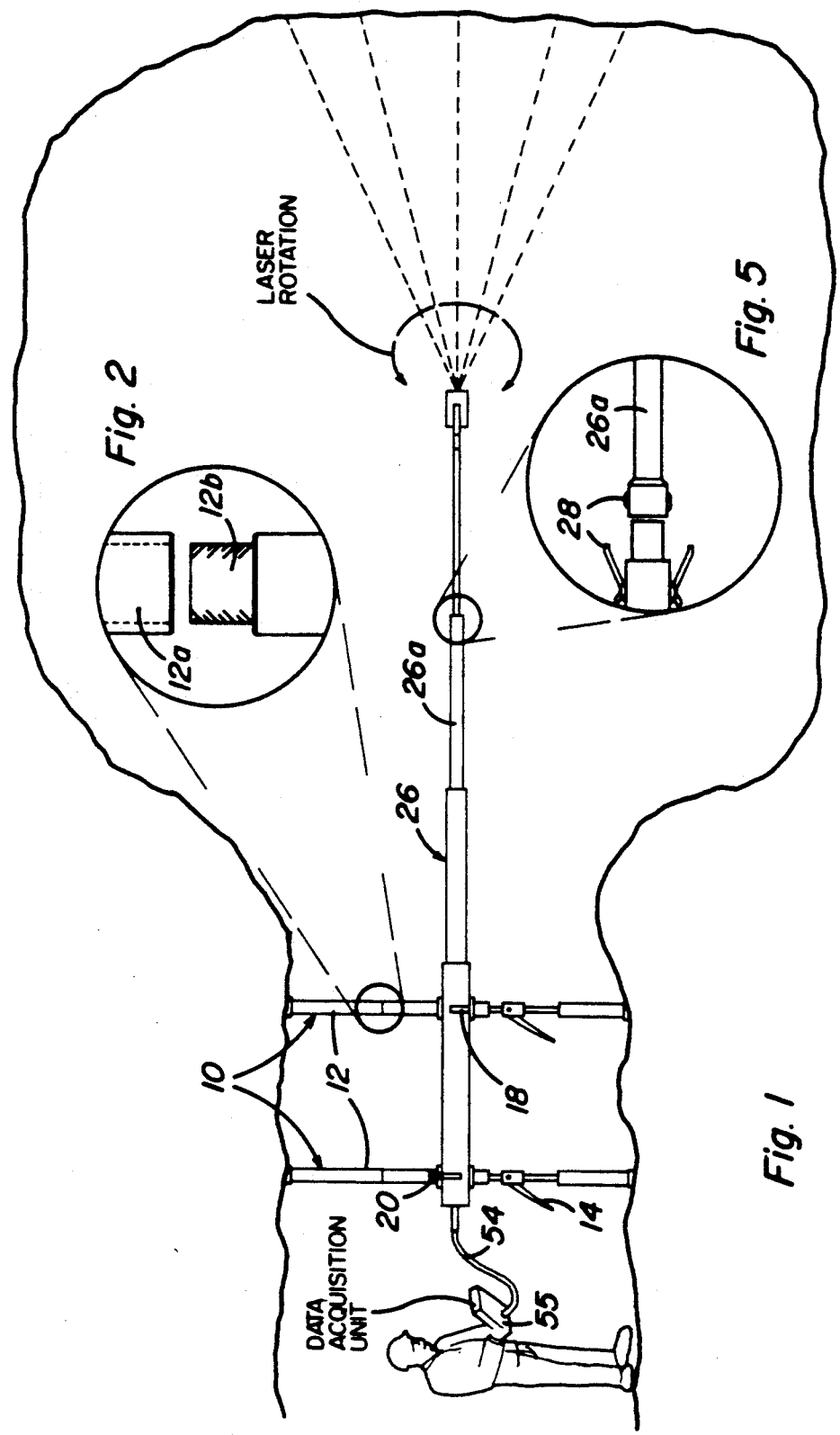

CAVITY MONITORING SYSTEM

This invention relates to a system for measuring the dimensions of a mined stope, or any other cavity in development or once terminated, or to measure the size of a muck pile or evaluate the stage of a mining development such as a raise or a drift.

The general development of technology has permitted to solve many mining problems to date. However, there is no system permitting to measure rapidly and with precision the dimensions and volume of a mined stope or any other underground cavity. The evaluation of such data would permit to estimate the efficiency of a mining method.

Actually, the efficiency of a mining method may be estimated by evaluating the dilution originating from the back breaks of mined walls and roof, by estimating the damages caused by blasting and by observing the size and type of the broken rock in the mine drawpoints. All these evaluations are, however, based on visual observations and on the experience of an operator or miner. These measurements are thus not very objective and vary greatly.

Other methods permit to obtain a more precise measurement of what has been mined in the stope. The measurement of the output tonnage and of the tonnage treated by the concentrator in comparison to what has been planned permits to obtain a good estimate of the situation. However, this method has several disadvantages such as: (1) it is necessary to wait several days or weeks before obtaining the tonnage from the mill, (2) the values obtained are only qualitative and no information concerning the source or origin of the dilution or of the blasts back breaks may be obtained. Furthermore, little information helping to optimise future planning may be derived.

An apparatus using ultrasonic waves has been recently developed by Noranda Inc. (U.S. Pat. No. 4,845,990 granted Jul. 11, 1989). However, several disadvantages have been experienced during use of such an apparatus such as: (1) the apparatus may not be effectively used for measuring distances over 55 feet, (2) the measurements are inaccurate when the surfaces to be measured are inclined with respect to the apparatus resulting in false results, (3) the apparatus may be used from a vertical access only, (4) its orientation during measurement is often inaccurate, (5) the weight and size of the apparatus are not well suited to be used underground, and (6) the apparatus and its associated components are sensitive to a foggy and dusty environment.

For some years, another measurement technique originating from a sophisticated surveying apparatus (called total station) seems to have gained a certain interest for some mining operations. This apparatus is a prismless laser theodolite called EDM (Electronic Distance Measurement) which permits to measure the distance separating such apparatus from the wall or the roof of a mined stope as well as the angle of sight. However, this apparatus has the following disadvantages: (1) its cost is high, amounting to several ten thousands of dollars, (2) the apparatus is sensible to the mining environment, (3) the apparatus must be installed on a tripod base in a safe area away from the underground cavity, which reduces even more its field of sight, (4) many accesses to the mined stope must be available, which is rarely the case in a mine, to be able to cover the full underground cavity. Furthermore, the apparatus does not work automatically following a pattern of laser measurement permitting to calculate the volume and to rapidly interpret the measurements.

It is therefore the object of the present invention to provide a system which would permit to rapidly measure the dimensions and determine the shape and volume of a cavity without the disadvantages of the above mentioned apparatus.

The system in accordance with the present invention comprises a supporting system adapted to be installed in an access leading to a mined stope, or any other cavity, a mast mounted on such supporting system and adapted to extend into the cavity, and a laser rangefinder mounted at the end of the mast, such laser rangefinder being capable of being rotated around the axis of the mast and directed at the wall of the cavity at angles varying from 0 to 145 degrees from the axis of the mast so as to scan concentric circles on the wall of the cavity permitting to take series of distance measurements to obtain the shape and volume of the cavity.

In an underground cavity, such supporting system preferably comprises two adjustable vertical posts which are clamped between the floor and the roof of an access to the cavity, each post having guide means permitting horizontal positioning of the mast.

The mast is preferably made of hollow sections which slide into each other for ease of transportation.

The laser rangefinder is pivotally mounted between the legs of a fork assembly which is itself rotatably mounted on a bushing secured to the end of the mast. A first motor is mounted on the bushing for rotating the fork assembly around 360 degrees and a second motor is mounted on the fork assembly for pivoting the laser rangefinder about 145 degrees.

A data acquisition and control unit is located away from the laser rangefinder and a cable is passed through the centre of the mast for interconnecting the laser rangefinder to the data acquisition and control unit.

The invention will now be disclosed, by way of example, with reference to the accompanying drawings in which:

FIG. 1 is a schematic diagram of a stope monitoring system in accordance with the present invention;

FIG. 2 is a view showing how the sections of the vertical posts are joined together;

FIG. 5 is a view showing how a number of extension tubes forming the mast are interconnected together;

Figures 3, 3A:
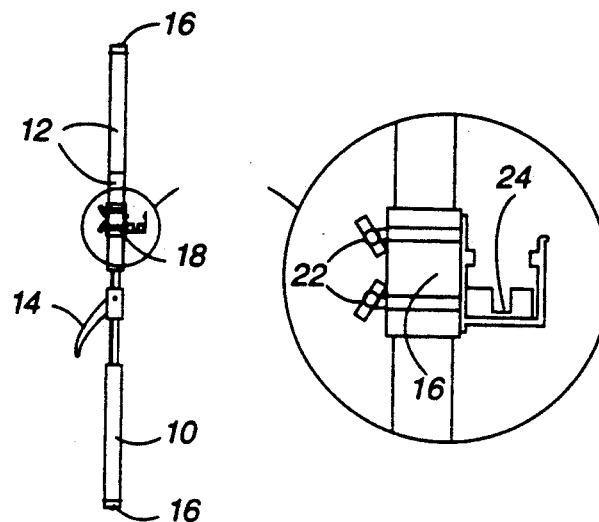
FIGS. 3, 3a, 4 and 4a are views showing how the horizontal mast is mounted on the vertical posts.
Figures 4, 4A:
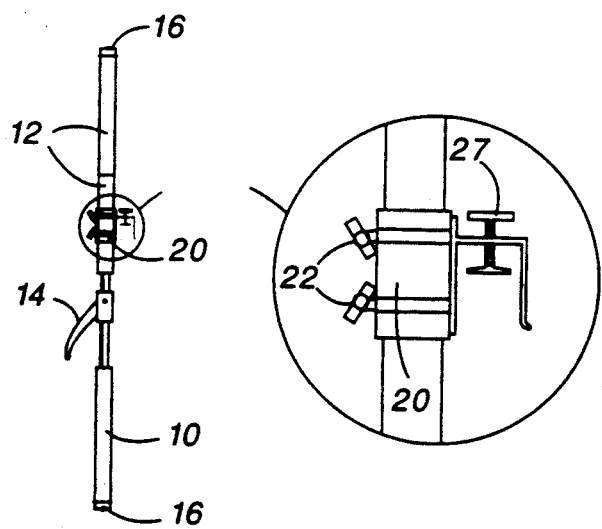

Referring to FIG. 1, the stope measuring system comprises a supporting system including two vertical posts 10 which are made of several sections 12 of suitable lengths and having male and female parts 12a and 12b as shown in FIG. 2 of the drawings. A conventional crank mechanism 14 is provided on each post to extend the posts to maintain them firmly between the floor and the roof of the access to the stope. The extremities of the posts are preferably provided with spikes 16 for engaging the rock. As shown more clearly in FIGS. 3, 3a, 4 and 4a, two removable guides 18 and 20 are attached to the front and rear posts, respectively, by means of clamps 22. The front guide 18 is provided with front saddles 24 for guiding a horizontal mast 26. The rear guide 20 is provided with an adjustment screw 27 for horizontally aligning the mast.

The mast is preferably made of hollow sections 26a of composite material which slide into each other for ease of transportation. When they are extended the sections are secured to each other by means of detachable clamps 28 as shown in FIG. 5 of the drawings.

Figure 6:
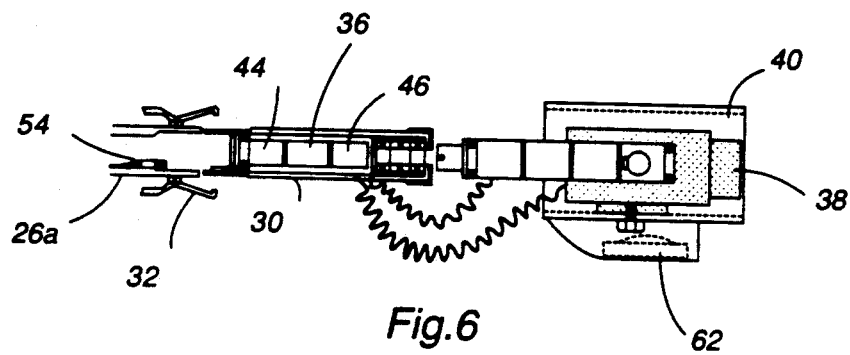
FIGS. 6 and 7 are views showing how the laser rangefinder is mounted on the end of the horizontal mast.
Figure 7:
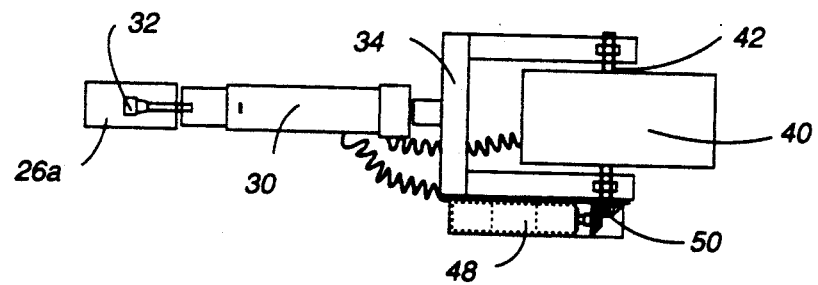

As shown in FIGS. 6 and 7, a bushing 30 is mounted at the end of the mast by means of clips 32. A fork assembly 34 is rotatably mounted at the end of the bushing by means of a motor 36 located inside the bushing. A laser rangefinder 38 is mounted within a housing 40 which is pivotably mounted on a shaft 42 between the legs of the fork assembly. Motor 36 is provided with a magnetic encoder 44 and speed reducing gears 46 for step by step rotation of the fork assembly by 360 degrees. Another motor 48 and associated magnetic encoder and speed reducing gears is mounted on the fork assembly and coupled to shaft 42 by gears 50 for step by step pivotal of the laser rangefinder from 0 to about 145 degrees. The laser rangefinder, which may be a G-150 Rangefinder sold by Optech, is mounted in a housing made of composite material which permits to protect the laser rangefinder against shocks, dust and the damp environment normally found underground. A double inclinometer 52 is also mounted on the housing underneath the laser for levelling the horizontal mast.

Figure 8:
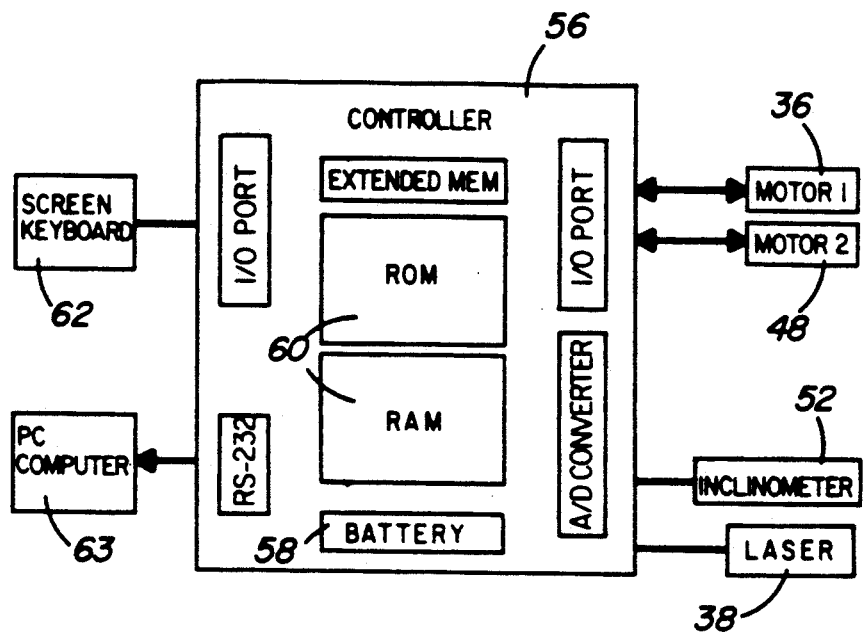
FIG. 8 is a schematic diagram of the data acquisition and control unit.

A cable 54 passes through the centre of the horizontal mast to provide suitable power for the operation of the two motors, the inclinometer, and the laser rangefinder. The cable is connected at the other end of the mast to a data acquisiton and control unit 55 which is shown diagrammatically in FIG. 8 of the drawings. The data acquisition and control unit contains a controller 56, batteries 58, suitable memories 60, a screen and keyboard 62 and a RS232 communication output allowing transfer of monitored data to another PC computer 63 where calculation of the size and volume of the underground cavity is calculated.

Figure 9:
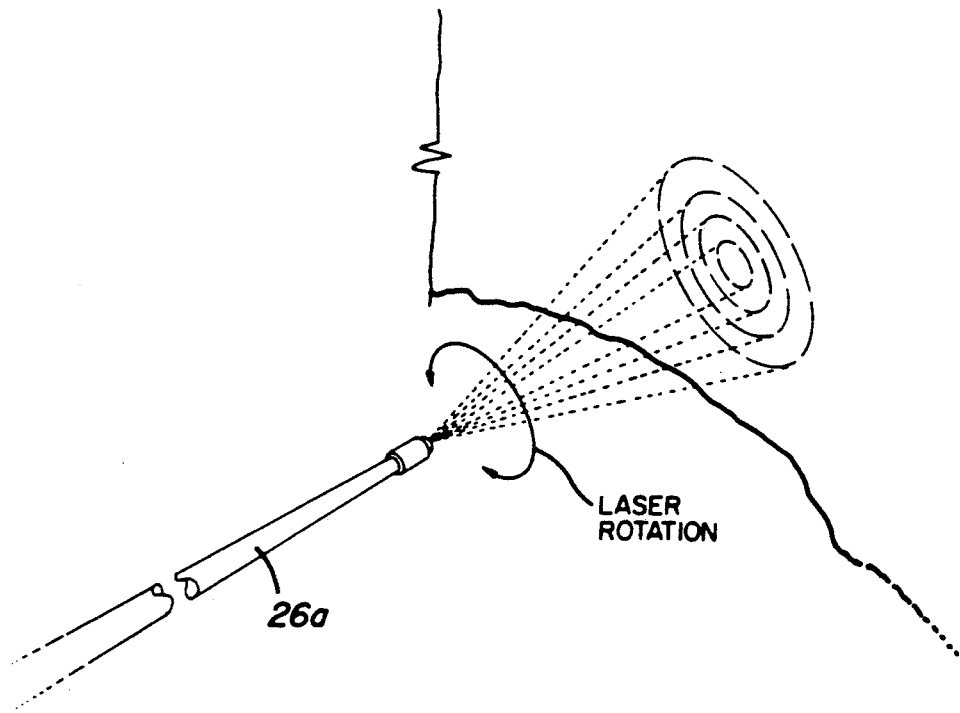
FIG. 9 shows the concentric circles scanned by the laser rangefinder on the wall of a cavity.

The operation of the cavity monitoring system in accordance with the present invention is as follows. The mast is maintained horizontally by the vertical posts and the laser rangefinder is positioned inside the underground cavity using the required number of extension tubes. Once in position the fork assembly is rotated step by step a full 360 degrees for each angular position of the laser rangefinder from 0 to 145 degrees in the fork assembly. This allows to scan concentric circles inside the underground cavity as shown in FIG. 9. The distance measurements shown by the laser rangefinder permit to determine the shape and volume of the underground cavity.

Although the invention has been disclosed with reference to a prefered embodiment, it is to be understood that it is not limited to such embodiment but that other alternatives within the scope of the following claims are also envisaged.

We claim:

1. A cavity monitoring system comprising:
   a) a supporting system adapted, to be installed in an access leading to a cavity;
   b) a mast mounted on said supporting system and adapted to extend into the cavity;
   c) a laser rangefinder mounted at an end of said mast, said laser rangefinder being capable of being rotated around an axis of the mast and directed at a wall of the cavity at angles varying from 0 to 145 degrees from the axis of the mast so as to scan concentric circles on the wall of the cavity permitting a series of distance measurements to be taken so that the shape and volume of the cavity can be obtained.

2. A cavity monitoring system as defined in claim 1, wherein for an underground cavity, said supporting system comprises two adjustable vertical posts which are clamped between a floor and a roof of said access leading to the cavity, each post having guide means for permitting horizontal positioning of the mast.

3. A cavity monitoring system as defined in claim 1, wherein the mast is made of hollow sections which slide into each other.

4. A cavity monitoring system as defined in claim 1, wherein said laser rangefinder is pivotally mounted between legs of a fork assembly which is itself rotatably mounted on a bushing secured to the end of said mast, and further comprising a first motor mounted on the bushing for rotating the fork assembly around 360 degrees and a second motor mounted on the fork assembly for pivoting the laser rangefinder about 145 degrees.

5. A cavity monitoring system as defined in claim 1, further comprising a data acquisition and control unit located away from the laser rangefinder and a cable passing through the centre of the mast for interconnecting the laser rangefinder to the data acquisition and control unit.

* * * * *